Patented Jan. 12, 1937

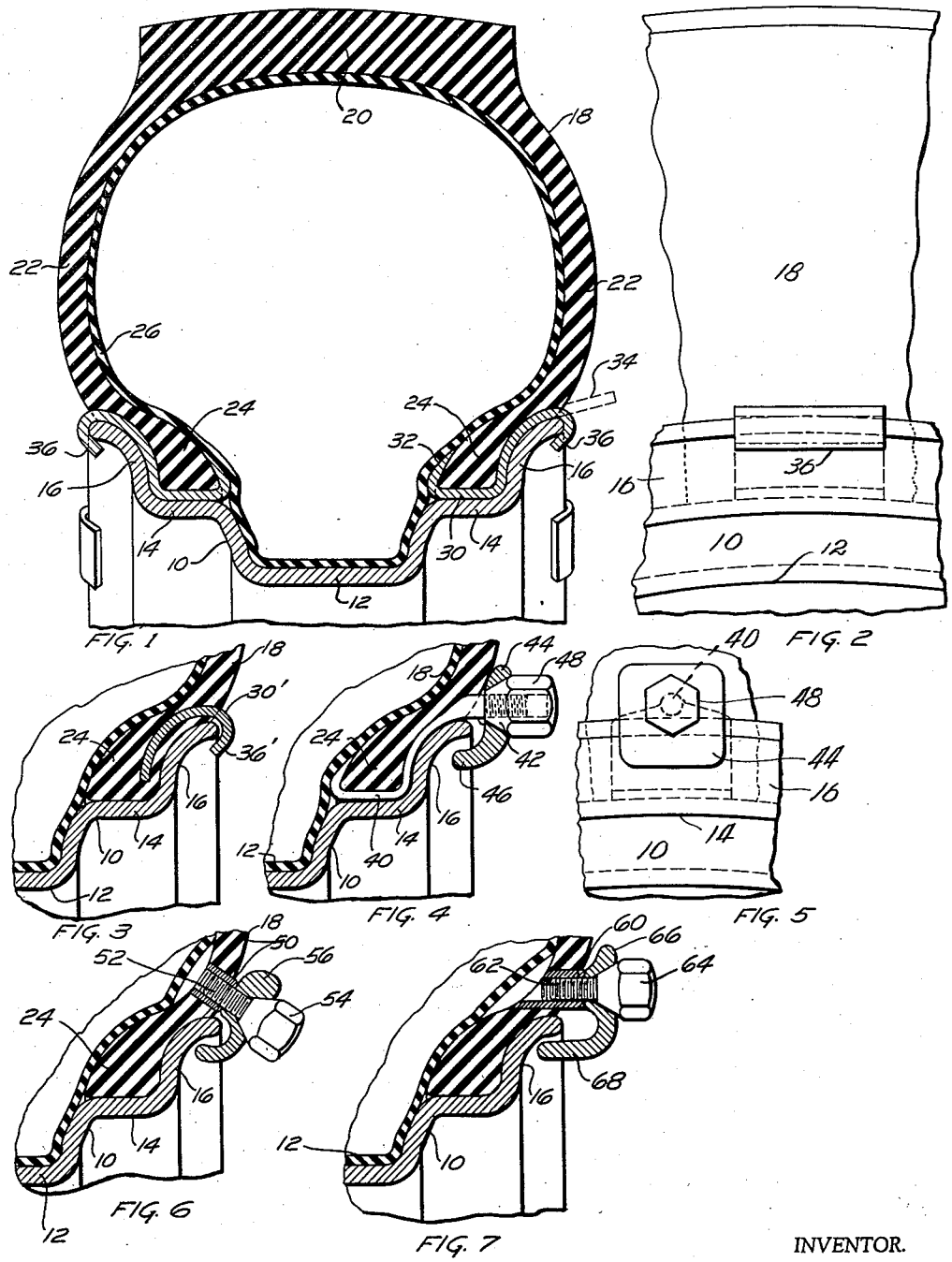

2,067,448

UNITED STATES PATENT OFFICE 2,067,448

TIRE RETAINING DEVICE

Harry J. Horn, Lansing, Mich., assignor to Motor Wheel Corporation, a corporation of Michigan Application August 17, 1934, Serial No. 740,268

17 Claims. (Cl. 152—20)

This invention relates to means for preventing a pneumatic tire casing from inadvertently coming off of a drop center rim of a wheel of a motor vehicle when the tire becomes deflated while the vehicle is in motion, the principal object being the provision of means of this character that are simple in construction and efficient in use.

Objects of the invention include the provision of means cooperating with the beads of a pneumatic tire casing and cooperating flange of a drop center rim that will prevent the bead from inadvertently moving into the well of the rim; the provision of a tire casing having means circumferentially spaced around the beads thereof and cooperable with the flanges of a drop center rim to prevent the beads from inadvertently moving into the well of the rim; the provision of means cooperating between the beads of a pneumatic tire casing and the cooperating flanges of a drop center rim to prevent the beads from moving into the well of the rim when the tire is deflated, but normally inactive when the tire is inflated; and the provision of means on a tire casing arranged in circumferentially spaced relation about the beads thereof and so constructed and arranged as to cooperate with means engageable with the outer wall of the side flanges of a cooperating drop center rim when the tire is deflated to prevent the beads from moving into the well of the rim.

Other objects of the invention are to provide a bendable metallic element associated with the bead of a pneumatic tire casing and bendable into interlocking relation with respect to the corresponding side flange of a drop center rim for the tire to maintain the bead thereof against material laterally inward displacement; the provision of a tire casing having a plurality of bendable metallic elements arranged in spaced relation with respect to the tire around the beads thereof; and the provision of a pneumatic tire casing having a plurality of bendable metallic elements arranged in spaced relation with respect to each other circumferentially of the tire and having one end thereof embedded in or adjacent the bead of the tire casing.

Further objects of the invention are to provide a pneumatic tire casing having a plurality of screw threaded members incorporated therein and spaced from each other circumferentially of the tire adjacent the bead thereof; the provision of a pneumatic tire casing having a plurality of nut members incorporated therein in spaced relation circumferentially of the tire adjacent the beads thereof; and the provision of a tire and rim assembly in which the tire is provided with a plurality of circumferentially spaced members adjacent the bead thereof and a clamping member cooperatively associated with each of the first mentioned members and with the side flanges of the tire rim.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary, sectional view taken axially through a pneumatic tire and rim assembly.

Fig. 2 is a fragmentary, side elevational view of the construction shown in Fig. 1.

Fig. 3 is a fragmentary view similar to Fig. 1 illustrating a different form of retaining means.

Fig. 4 is a view similar to Fig. 3 showing a different form of retaining means.

Fig. 5 is a fragmentary side elevational view of the construction shown in Fig. 4.

Figs. 6 and 7 are views similar to Figs. 3 and 4 but illustrating modified forms of construction for the retaining means.

There is an increasing modern tendency in the motor vehicle art toward the use of drop center rims for the pneumatic tires. There are various reasons for this tendency among which is the ability to use an unsplit single-piece rim which gives greater rigidity, is cheaper to manufacture and eliminates the use of removable side flange members, and particularly in view of the modern tendency toward smaller wheels having tires of larger cross-sectional area requiring a wider rim of smaller diameter it offers the best construction for the quick and easy application of a tire to and removal of a tire from the rim. There is, however, one serious disadvantage in connection with the use of drop center rims on tires of the type described and that is in case of a blowout while traveling at medium or high speed the tire often works itself off of the rim before it is possible to stop the vehicle of which it forms a part, allowing the corresponding rim to contact directly with the ground or other road surface and making it almost impossible to properly control the vehicle in such case, usually resulting in an accident. In case of such blowout, even if the tire does stay on the rim, if one or both beads of the tire work into the well of the rim an equally dangerous situation results in that the tire casing tends to fold over on a bias which gives an angular effect to the tire, which causes it to act in a manner similar to derailing devices employed in railway work, thus causing the vehicle to lurch one way or the other depending upon the direction of the folds, and making it difficult, if not impossible in some circumstances, to control the direction of movement of the vehicle. If it is possible to hold the beads of the tire in proper position on the rim in either of the above cases until the vehicle is stopped, liability of an accident is greatly reduced. The present invention deals with means for preventing a tire on a drop center rim from inadvertently coming off of the rim and the beads of the tire from moving into the well of the rim in case of a blowout while the vehicle of which it forms a part is under motion.

Inasmuch as there is no necessity for providing any means additional to those now provided for maintaining the tire and rim in properly assembled relation when the tire is properly inflated, it will be understood that the means provided in accordance with the present invention are not designed or intended to maintain the proper assembled relationship of the tire and rim under such conditions. Furthermore, in view of the fact that if a modern large section tire of relatively small number of fabric plies blows out while the vehicle of which it forms a part is traveling at speed the entire casing is usually completely ruined, there is no particular object in connection with the present invention in attempting to prevent damage to the tire casing in case of such blowouts. This fact permits simplification of the structure provided for attaining the desired result.

Referring first to Fig. 1 of the drawing, a drop center rim is indicated generally at 10 and as including a central radially inwardly depressed channel portion 12 the channel of which is commonly referred to as a well, horizontally outwardly extending portions 14 at the open edges of the well or channel 12, and radially and axially outwardly curved side flange portions 16 at the outer edge of each of the portions 14. It will be understood that the rim 10 is of circular formation of the section shown and that it is unsplit or, in other words, circumferentially continuous. A tire or more properly a tire casing is illustrated generally at 18 as comprising a tread portion 20 and side walls 22 which terminate at their axially inwardly turned radially inner edges in conventional beads 24, the radially inner faces of the beads 24 being adapted to engage the radially outer faces of the corresponding portions 14 of the rim 10 and the outer faces of the side walls 22 adjacent the beads 24 being adapted to contact the axially inner faces of the corresponding flanges 16, all in accordance with conventional practice. An inner tube 26 is received within the casing 18 and the well 12 of the rim 10 in accordance with conventional practice to provide an imperforate flexible envelope for the air which is held under compression within the casing 18. It will be understood that in order to remove the casing 18 and inner tube 26 from the rim 10 the beads 24 at opposite sides of the casing 18 at one point in the circumference of the tire are urged inwardly toward one another and then moved radially inwardly into the well 12, this causing the beads 24 at the diametrically opposite portions of the tire to project radially outwardly beyond the flanges 16 which thus permits the tire to be removed from the rim. Such operations are, of course, reversed when the tire is being applied to the rim.

The beads 24 being substantially non-stretchable circumferentially thereof, it will be apparent that as long as there is a sufficient pressure of air within the tube 26 to hold the beads 24 outwardly into contact with the side flanges 16 around the entire circumference of the rim, it will be impossible for the tire 18 to become removed from the rim. However, should a blowout develop so as to release the air from the tire, no material force remains tending to maintain the beads 24 in their proper positions and under the excessive deformation of the casing 18 caused by the load of a vehicle acting upon it while rolling, the beads 24 are commonly forced into the well 12 over part of the circumference of the tire in such cases and the tire often works itself off of the rim, thus allowing the corresponding portion of the vehicle to drop to such an extent as usually to cause the driver to lose control of the direction of movement thereof. It will be apparent that if it is possible to maintain the beads 24 in their proper positions against the flanges 16 over their entire circumference when a blowout occurs, they will never be able to move into the well 12 as is necessary in order for the casing 18 to come off of the rim 10, and in such case the amount which the corresponding portion of a vehicle drops in case of a blowout will be materially reduced and the possibility of an accident from this reason eliminated to a great extent. The present invention deals with means for preventing inadvertent displacement of the beads 24 of the casing 18 inwardly into the well 12 and thus eliminates the above described dangers of conventional constructions in this respect.

In the form of the invention shown in Figs. 1 and 2 a plurality of metallic clips indicated generally at 30 are applied to each of the beads 24 in circumferentially spaced relation with respect to each other about the beads. Each clip 30 is formed to provide a hook-shaped inner end which embraces and is clamped about the radially inner edge of the corresponding bead 24. The end of this inner hook portion which lies within the casing 18 is preferably tapered in thickness as at 32, and its edges are correspondingly beveled so as to offer no sharp edge upon which the inner tube 26 may rub or wear. The axially outer end of each of the clips 30 is bent to a shape complementary to the inner face of the flanges 16 of the rim 10 and initially projects beyond the radially outer edge of the flanges 16 to provide a tongue as indicated by dotted lines at 34. Because the hook-shaped inner ends of the clips 30 are clamped about the corresponding beads 24, the clips 30 are maintained in position with respect to the casing 18 when the casing is not assembled to the rim 10 and, as will be obvious, they are of such nature as not to interfere with the assembly or disassembly of the casing 18 to or from the rim 10.

In operation the casing 18 with the clips 30 applied thereto and with the outer ends thereof projecting outwardly, for instance, as indicated at 34, is applied to the rim 10 in the conventional manner. The tire may then be inflated and the projecting ends or tongues 34 then hammered or otherwise bent downwardly and inwardly as at 36 to cause such ends to hook over the free edge of the corresponding flange 16 of the rim 10.

For this reason the material from which the clips 30 are made is preferably of such a nature as to readily permit the ends 36 to be bent to the position indicated. It may be noted that the clips 30 are shown in the drawing and particularly in Figs. 1, 2, and 3 of exaggerated thickness. Ordinarily, they will be of such thickness as when applied to a tire of usual and conventional construction their presence between the bead and the rim will not be such as to materially interfere with the proper fitting relation between these parts. On the other hand, it will be recognized that a tire casing such as 18 may be so constructed and arranged in production as to provide suitable circumferentially spaced recesses so as to permit the clips 30 to seat therein in flush relation to the outer surface thereof.

It will be readily understood that with the construction described the clips 30 in cooperating between the corresponding flanges 16 and 24 will prevent the beads 24 from moving inwardly into the well 12 of the rim 10 until the ends 36 are bent upwardly into the position indicated at 34 and also that such bending must be purposely accomplished. Accordingly, should the tire blow out while the vehicle of which it forms a part is in motion the tire will never come off from the rim because of the beads thereof moving into the well of the rim until the clips are purposely operated upon to permit it and, consequently, the tire will remain on the rim until the driver of the vehicle has had an opportunity to bring the vehicle to a stop.

In Fig. 3 a modification of the construction shown in Figs. 1 and 2 is illustrated. In this case the clips 30' do not have a hook-shaped inner end as in Figs. 1 and 2 but instead the inner ends thereof are embedded within the beads 24 of the casing 18 during manufacture of the casing 18. Preferably the embedded ends are vulcanized in the beads. The outer ends of the clips 30' are allowed to project initially in the same manner as the tongues 34 shown in Figs. 1 and 2 and after application of the tire casing to the rim 10 such ends are bent inwardly as at 36' to effect the same result as is obtained by the construction illustrated in Figs. 1 and 2.

In Figs. 4 and 5 a further modification of the above described structure is shown. In this case clips 40 are employed which, except for their outwardly projecting end portions, are identical to the clips 30 shown in Figs. 1 and 2. In other words, these clips 40 have a hook-shaped inner end which embraces and is clamped about the radially inner margins of the corresponding beads 24. The clips 40, instead of having a bendable outer end as in the construction previously described, are formed to present an axially outwardly projecting stud portion 42. Each stud portion 42 slidably receives thereon a clamping member 44 having a hook-shaped radially inner end 46 adapted to radially inwardly underlie the outer edge of the corresponding rim flange 16. A nut 48, preferably having a conical inner end surface fitting a complementary surface in the clamp member 44, is threaded upon the stud portion 42 and maintains the clamping member 44 in operative relation with respect to both the tire casing 18 and to the rim 10. As will be obvious, this construction functions in the same manner as the previously described construction with the exception that in removing the tire from the rim it is necessary to first remove the nut 48 and then the clamping members 44 instead of bending outwardly the ends 36 or 36', as the case may be, employed in the previously described construction.

In Fig. 6 a modification of the construction shown in Figs. 4 and 5 is illustrated. In this case, instead of providing clip members of the nature previously described, screw members in the form of internally threaded sleeve members 50 are embedded in the casing 18 immediately outwardly of the corresponding beads 24 and just radially outwardly beyond the radial outer limits of the corresponding side flange 16 of the rim 10. The sleeves 50 are, of course, arranged around the casing 18 in circumferentially spaced relation with respect to each other, and in the modification shown in Fig. 6 the axes of the sleeve members 50 are arranged at an angle to both the plane of and the axis of the rim 10. A stud 52 having a head 54 is provided for each sleeve 50 and acts to secure a clamping member 56 in the same interlocking relation with respect to the outer edge of the corresponding side flange 16 as in the construction described in connection with Figs. 4 and 5. Also as noted the head 54 of the stud 52 is preferably tapered at one end and the clamping member 56 is provided with a complementary surface for engagement therewith.

In the construction illustrated in Fig. 7 the same type of construction provided for in Fig. 6 is shown. In other words, sleeve members 60 are provided corresponding to the sleeve members 50 in Fig. 6 but in this case the axes of the sleeve members 60 are disposed in parallel relation with respect to the axis of the tire and/or rim. Stud members 62 corresponding to the studs 52 in Fig. 6 and having heads 64 corresponding to the heads 54 are provided for each sleeve member 60. A clamping member 66, corresponding to the clamping member 56, is also provided for each stud 62, but in this case the hook end portion 68 of each clamping member is of a more extended nature to enable it to properly cooperate with the outer edge of the corresponding side flange 16 as necessitated by the change in the axis of the sleeve member as compared to the construction shown in Fig. 6. As will be recognized, the function of all of the means shown and described herein is the same in that they prevent the cooperating beads 24 of the tire casing 18 from inadvertently moving axially inwardly into the well 12 of the rim 10 should the tire blow out.

It will be understood that the various modifications of the present invention shown and described herein are but illustrative of the broad principles of the present invention which is obviously subject to further modifications in accordance with the teachings herein and, accordingly, formal changes may be made in the specific embodiment of the invention described without departing from the spirit or substance of the broad invention, the scope of which is commensurate with the appended claims.

I claim:

1. In combination, a drop center rim, a tire casing mounted thereon, and means normally inoperative when said casing is inflated and arranged circumferentially of said tire casing cooperating between said tire casing and said rim for maintaining the beads of said casing against inadvertent displacement into the well of said rim when said casing is deflated.

2. In combination, a drop center rim, a tire casing mounted thereon, and means normally inoperative when said casing is inflated and cooperating between said casing and the side flanges of said rim for maintaining the normal operative relationship of the beads of said casing with respect to said rim when said casing is deflated.

3. In combination, a drop center rim having a central well and axially outwardly curving side flange elements axially spaced therefrom, a tire casing mounted upon said rim and having bead elements normally engaging said side flange elements, and means normally free from operative engagement with one of said elements when said casing is inflated for cooperating between said bead and flange elements when said casing is deflated for maintaining said bead elements against material inadvertent inward displacement with respect to the corresponding flange elements.

4. In combination, a drop center tire rim having a central well and axially outwardly curved side flanges axially spaced therefrom, a tire casing mounted upon said rim and having beads engaging said flanges, and means secured to said beads hooked over and normally spaced from the axially outer edges of said flanges when said casing is inflated, said means being adapted to interlock with said axially outer edges of said flanges when said casing is deflated below its normal operating condition.

5. In combination, a drop center rim having a central well and axially outwardly curving side flanges axially spaced therefrom, a tire casing mounted upon said rim and having beads normally engaging said side flanges, and means secured to said beads extending axially outwardly and then radially inwardly therefrom into hooked relation with respect to said side flanges, the hooked portion of said means being normally spaced outwardly from said side flanges when said casing is inflated and adapted to interlock therewith only when said tire is deflated below its normal operating condition.

6. In combination, a drop center rim having a central well and axially outwardly curving side flanges axially spaced therefrom, and a plurality of clips arranged in circumferentially spaced relation with respect to said casing and having a portion thereof embedded within said beads extending into hooked relation with respect to said flanges.

7. In combination, a tire rim, a pneumatic tire casing mounted upon said rim, a plurality of screw elements arranged in circumferentially spaced relation with respect to said casing and fixed thereto, and means on said screw elements having portions arranged in radially registering spaced relationship with respect to said rim when said casing is inflated and adapted to cooperate between said screw means and said rim only when said casing is deflated for maintaining portions of said casing against inadvertent and material axial displacement with respect to said rim.

8. In combination, a tire rim having a radially and axially outwardly curving flange at either edge thereof, a pneumatic tire casing mounted upon said rim, a plurality of nut members fixed with respect to said casing in spaced relation circumferentially thereof and on both sides thereof, a stud cooperable with each of said nut members, and a clamping member associated with each of said studs and normally held in spaced relation to the corresponding of said flanges, said members being adapted to cooperate with the corresponding of said flanges only when said casing is deflated below a normal operating condition to maintain substantially normal operative engagement between said casing and said flanges.

9. In combination, a tire rim having a radially and axially outwardly curving flange at either edge thereof, a pneumatic tire casing mounted upon said rim, a plurality of nut members fixed to said casing in circumferentially spaced relation with respect to each other about said casing on both sides thereof, a stud cooperating with each of said nut members, and a clamping member cooperating with each of said studs and normally held by engagement with said nut in spaced hooked relation with respect to the corresponding of said flanges when said casing is inflated, said members being engageable with said flanges to maintain the normal operative engagement of said casing and rim when the casing is deflated.

10. In combination, a pneumatic tire casing and a plurality of axially outwardly directed bendable metallic tongues fixed thereto and arranged in circumferentially spaced relation thereabout.

11. In combination, a pneumatic tire casing having beads, and clips secured to said beads in spaced relation to each other circumferentially of said casing and provided with axially outwardly directed bendable tongues.

12. In combination, a pneumatic tire casing having beads, and a plurality of clips having one end thereof embedded in said beads in circumferentially spaced relation about said casing and the other end thereof projecting outwardly from said casing, said outwardly projecting ends being bendable.

13. In combination, a rim, a tire casing mounted thereon, and means arranged circumferentially of said tire casing cooperating between said casing and said rim, said means being disposed to prevent inadvertent displacement of a bead of said casing relative to said rim when said casing is deflated but ineffective to prevent said displacement when said casing is inflated.

14. In combination, a rim, a tire casing mounted thereon, and means arranged circumferentially of said tire casing cooperating between said casing and said rim, said means being disposed to prevent inadvertent displacement of a bead of said casing relative to said rim when said casing is deflated but being acted upon by inflation of said casing to a condition in which it is ineffective to prevent said displacement.

15. In combination, a rim, a tire casing mounted thereon, and means arranged circumferentially of said tire casing cooperating between said casing and said rim, said means being disposed to prevent inadvertent displacement of a bead of said casing relative to said rim when said casing is deflated but being actuated by inflation of said casing to a position in displaced relation to said rim in which it is ineffective to prevent said displacement.

16. In combination, a rim having axially outwardly curving side flanges, a tire casing mounted upon said rim and having beads normally abutting said flanges, and means arranged circumferentially of said tire casing cooperating between said casing and said rim, said means being disposed to maintain said beads in abutting relation to said flanges when said casing is deflated, but ineffective to prevent displacement of said beads from said flanges when said casing is inflated.

17. In combination, a tire rim having an axially outwardly curving flange at either edge thereof, a pneumatic tire casing mounted upon said rim and disposed when inflated to engage said flanges, a plurality of screw members circumferentially spaced from each other around said casing and fixed with respect thereto on either side thereof, and means on said screw members cooperating between each of said screw members and the corresponding of said flanges to prevent material displacement of said casing from said flanges when said casing is deflated, said means being normally held in spaced registering relation to said flanges by engagement with said casing when the latter is inflated, and being disposed upon deflation of said casing to engage said flanges and prevent said displacement.

HARRY J. HORN.